(12) United States Patent
Yazdani

(10) Patent No.: US 7,353,608 B2
(45) Date of Patent: Apr. 8, 2008

(54) MULTIPLE CHANNEL RVDT WITH DUAL LOAD PATH AND FAIL-SAFE MECHANISM

(75) Inventor: Saeed Yazdani, Moorpark, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 0 days.

(21) Appl. No.: 11/339,040

(22) Filed: Jan. 25, 2006

(65) Prior Publication Data

US 2007/0169357 A1  Jul. 26, 2007

(51) Int. Cl.
  *G01B 5/24* (2006.01)
  *G01D 21/00* (2006.01)
(52) U.S. Cl. .......................... 33/1 PT; 33/706; 33/534
(58) Field of Classification Search ............. 33/1 PT, 33/1 N, 706–708, 534; 324/207.21, 207.25
See application file for complete search history.

(56) References Cited

U.S. PATENT DOCUMENTS

| 3,198,082 A | 8/1965 | Kerris |
| 3,422,327 A | 1/1969 | McBrayer et al. |
| 3,457,479 A | 7/1969 | Varner |
| 3,593,092 A | 7/1971 | Flippo |
| 3,640,183 A | 2/1972 | Koch et al. |
| 4,345,230 A | 8/1982 | Chass |
| 4,447,769 A | 5/1984 | Corney |
| 4,910,488 A | 3/1990 | Davis |
| 5,493,497 A | 2/1996 | Buus |
| 5,541,486 A | 7/1996 | Zoller |
| 5,701,114 A | 12/1997 | Chass |
| 5,779,587 A | 7/1998 | Reilly |
| 5,820,071 A | 10/1998 | Cross |
| 5,957,798 A | 9/1999 | Smith, III et al. |
| 6,507,188 B1 * | 1/2003 | Dilger et al. ............... 33/1 PT |
| 6,641,085 B1 | 11/2003 | Delea |
| 6,732,438 B2 * | 5/2004 | Enzinna ....................... 33/1 PT |
| 6,913,226 B2 | 7/2005 | Huynh |
| 7,017,274 B2 * | 3/2006 | Stobbe ........................ 33/1 PT |
| 7,040,025 B2 * | 5/2006 | Inoue .......................... 33/1 PT |
| 2005/0103928 A1 | 5/2005 | Flatt |

* cited by examiner

*Primary Examiner*—Yaritza Guadalupe-McCall
(74) *Attorney, Agent, or Firm*—Jeffer Mangels; Butler & Marmaro LLP

(57) ABSTRACT

An angular displacement sensor. The input shaft is supported by a housing and fixed to a main gear. A plurality of secondary gears are arranged around and meshed with the primary gear. A plurality of displacement sensors are integrally coupled with the secondary gears. Advantageously, the main shaft is formed with a shear notch. Further, each of the secondary gears are coupled to the displacement sensors so as to break free in case of a jam.

11 Claims, 5 Drawing Sheets

MULTIPLE CHANNEL RVDT WITH DUAL LOAD PATH AND FAIL-SAFE MECHANISM

BACKGROUND

The present invention relates generally to measuring devices, and more particularly, to an angular displacement sensor that has multiple channels.

In prior art angular displacement sensors using rotary variable differential transformer ("RVDT") technology, when the main shaft breaks, the RVDT's start rotating on their own. Further, if each RVDT channel jams, or the main shaft jams, the entire mechanism jams. It would be advantageous to avoid these problems, and to provide a self-null mechanism and an alternative load path in the event such problems do occur.

BRIEF SUMMARY OF THE PREFERRED EMBODIMENT

In the preferred embodiment, multiple RVDT's are contained in a package that includes a main housing with a coupling for an input shaft, which is in turn coupled to a load of interest. The input shaft is coupled to a main gear, which in turn is coupled to a plurality of secondary gears. Each of the secondary gears are coupled to the RVDT's shafts to provide active monitoring of the load of interest via multiple channels.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENT

The present disclosure is directed to improvements in force and displacement sensors, as exemplified by an embodiment using rotary variable differential transformer ("RVDT") technology. In the most general terms, the preferred embodiment of a sensor as described herein is contained in a package that includes a main housing with a coupling for an input shaft which is in turn coupled to a load of interest, for example, airplane flight controls. The input shaft is supported in the main housing by precision bearings, and advantageously, the shaft includes a shear notch near the input spline coupling. At the back end of the main housing, the input shaft is coupled to a main gear, which in turn is coupled to a plurality of secondary gears, each which are mounted in the back of the housing, and which include RVDT sensors coupled to the secondary gears for detecting angular displacement.

In the preferred embodiment described below, it should be recognized that recited dimensions and tolerances are approximate, and that the materials and dimensions are suggested for the preferred embodiment. Other embodiments may well be contemplated using different materials, different dimensions, and different tolerances, depending on the application. Such changes are considered to be within the scope of the invention. The following description is illustrative only and is not intended to be limiting.

Figure 1:
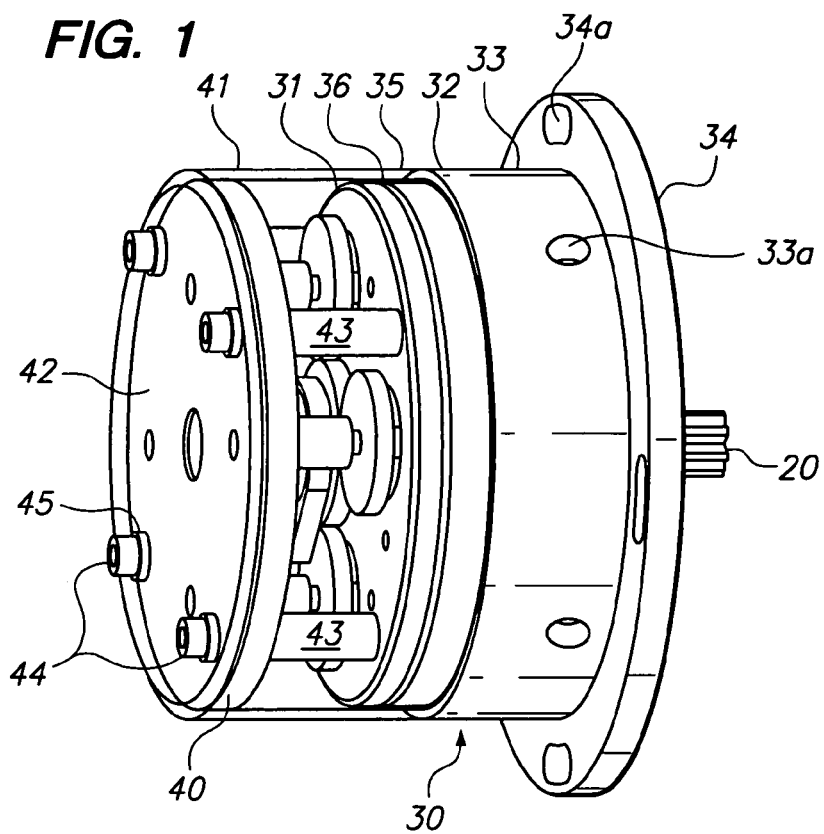
FIG. 1 is a perspective view of the preferred embodiment of an angular displacement sensor in accord with the invention with a portion of the sensor rendered as transparent.

FIG. 1 illustrates the preferred embodiment of a sensor package 10 intended to be used, for example, with aircraft flight controls. An input shaft 20 is received into the main housing 30, with a housing cover 40 (shown as transparent) mounted over the back of the main housing. The housing 30 and cover 40 provide containment and a support structure for mounting and coupling a series of gears and sensors to the input shaft, as described below. Advantageously, a primary gear is coupled to the input shaft, a plurality of secondary gears are coupled to the primary gear, and angular displacement sensors are integrally coupled with the secondary gears.

Figure 2:
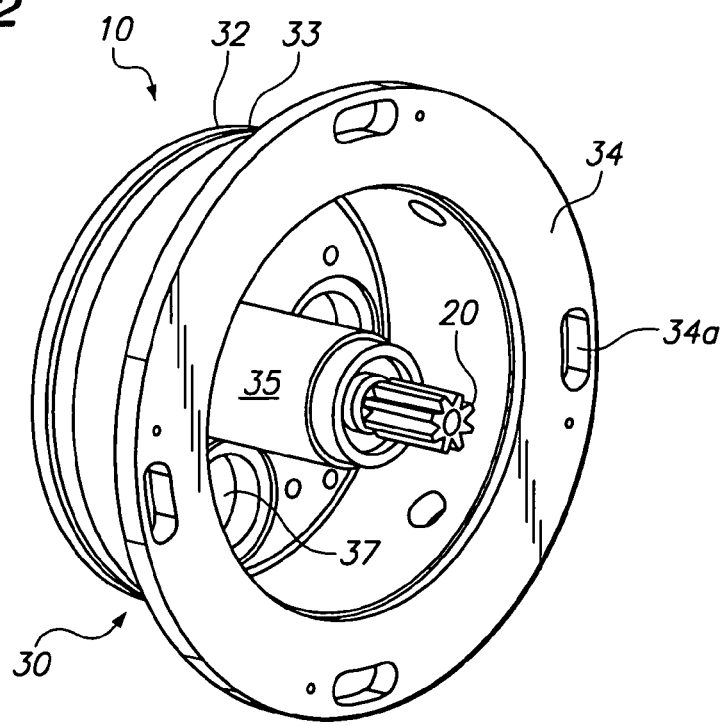
FIG. 2 is a perspective view of a portion of the sensor of FIG. 1

As can be seen in FIGS. 1 and 2, the main housing 30 includes a cover plate 31, a first cylindrical portion 32, a second cylindrical portion 33, a flange 34, and a shaft housing 35. Preferably, the main housing 30 is machined from a single piece of aircraft grade stainless steel, such as grade 304L, but the pieces could be individually machined and welded or brazed as necessary. The flange 34 has an outside diameter of 4.00 inches, an inside diameter of 2.75 inches, and a thickness of 0.188 inches. A series of elongated openings 34a are provided in the flange so that the sensor 10 may be rigidly affixed using standard fasteners in place with the flight controls (not shown).

The second cylindrical portion 33 has an outside diameter of 3.10 inches, an inside diameter of 2.70 inches, and a thickness of 2.00 inches. A series of openings 33a are provided on the side of the second cylindrical portion 33 for routing cables 38 (see FIG. 8) from inside of the housing 30.

The first cylindrical portion 32 has an outside diameter of 2.98 inches, an inside diameter of 2.70 inches, and a thickness of 0.250 inches. The difference in outside diameters of the first and second cylindrical portions create an annular region 35 to receive the cover 40. A recess 36 measuring 0.06 inches wide by 0.05 inches deep is machined into the outer surface of the first cylindrical portion 32, and a standard gasket 36 is fitted within the recess to provide a seal between the cover 40 and base 30.

The cover 40 is likewise machined from aircraft grade stainless steel, either as a single integral piece, or as individual pieces, with a cylindrical portion 41 and a top portion 42. A series of spacer columns 43 are fitted between the cover top portion 42 and main housing cover plate 31, and standard fasteners 44, such as a threaded bolt and nut, are used to secure these portions together, and washers 45 are used as a seal between the fasteners and the cover.

Figure 3A:
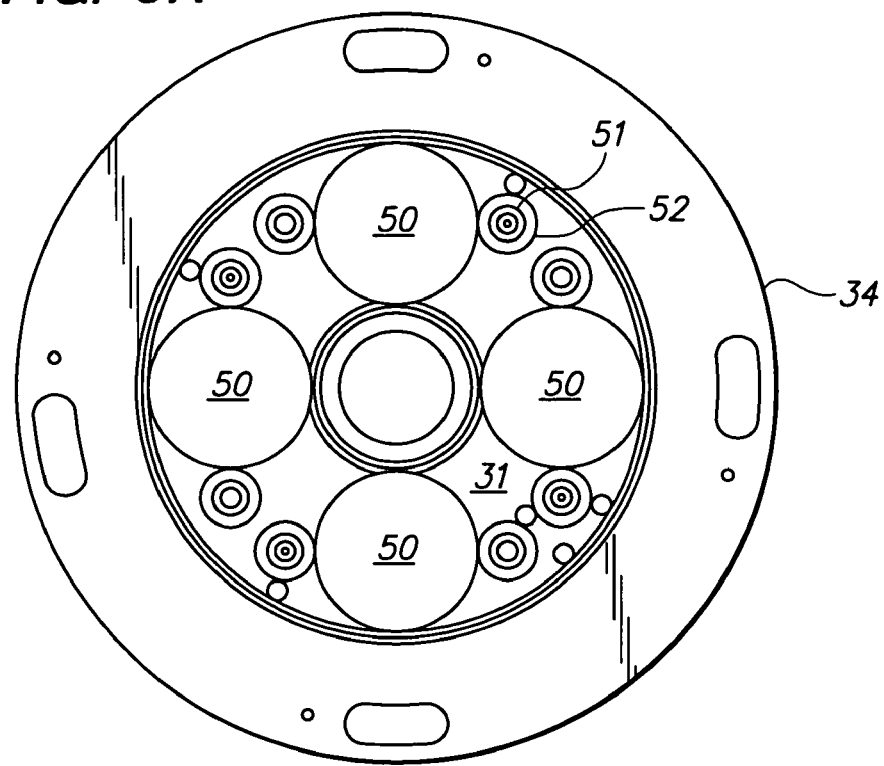
FIG. 3A is a bottom plan view of a portion of the sensor of FIG. 1.
Figure 3B:
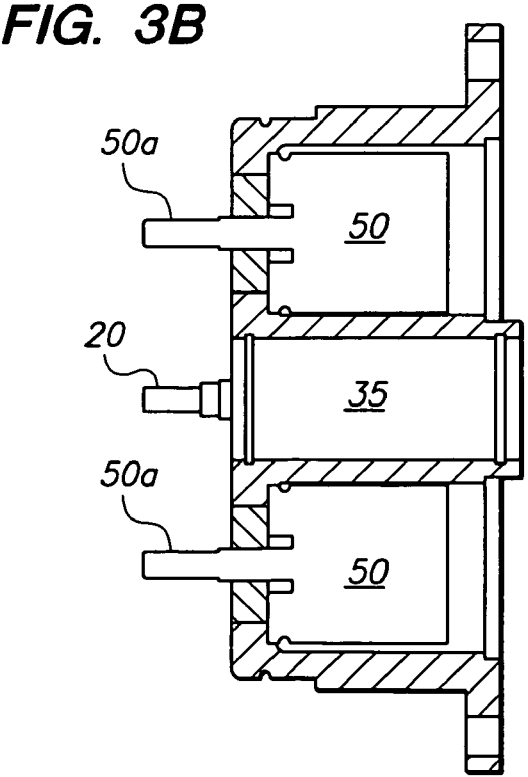
FIG. 3B is a side plan view of the same portion.

Referring back to FIG. 2, openings 37 having a diameter of 0.625 inches are provided in the housing cover plate 31 to receive RVDT units 50. As shown in FIGS. 3a and 3b, each of the RVDT units 50 is mounted to the main housing cover plate 31 inside of the main housing by standard fasteners, for example, two screws 51 with washers 52, with the shaft 50a of the RVDT extending through the housing. Also, the main shaft 20 extends through the housing.

Figure 4:
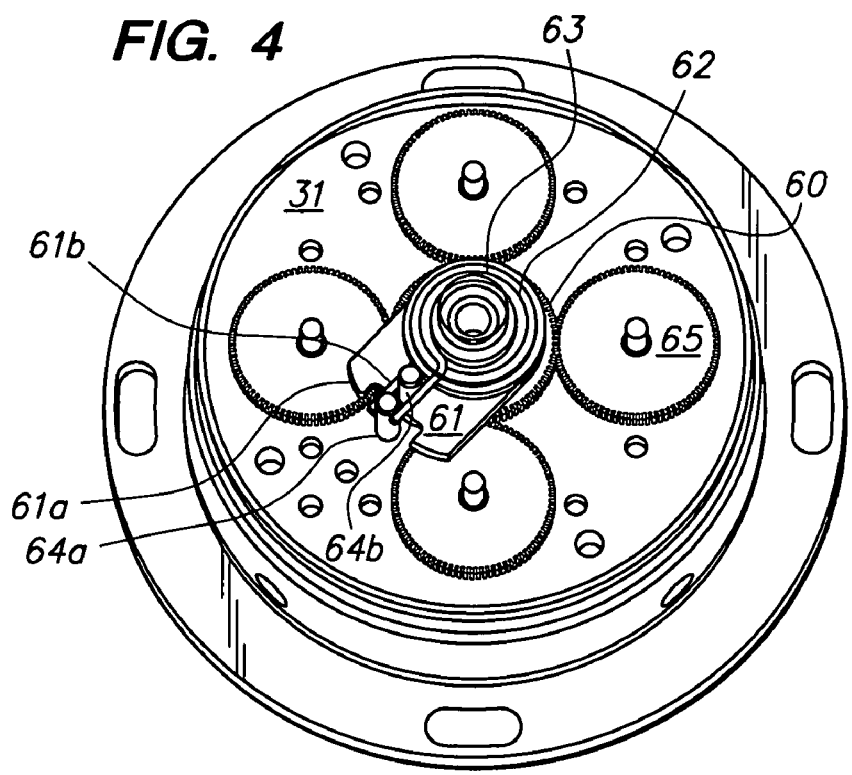
FIG. 4 is a top perspective view of a portion of the sensor of FIG. 1 showing the arrangement of the primary gear and the secondary gears.

As shown in FIG. 4, a solid main gear 60 is coupled to the main shaft 20, for example by weldment. The main gear 60 measures 0.958 inches in diameter with 90 teeth provided at a diametral pitch of 96, and is made from stainless steel. Mounted on top of the gear 60 is a metal null plate 61, a torsion spring 62, and a retainer plate 63. The metal null plate 61 includes a lateral recess 61a that measures 0.11 inches wide by 0.125 inches deep, and a hole 61b, that measures 0.125 inches in diameter. A pair of metal posts 64a, 64b are fixed to the housing cover plate 31 such that post 64b is held within hole 61b and post 64a is positioned within lateral recess 61a. The ends of torsion spring 62 are positioned on opposite sides of the posts 64a, 64b. Advantageously, this arrangement provides a self-nulling mechanism that forces all the RVDT's to go to a null position if the main shaft becomes broken or separated.

Figure 5:
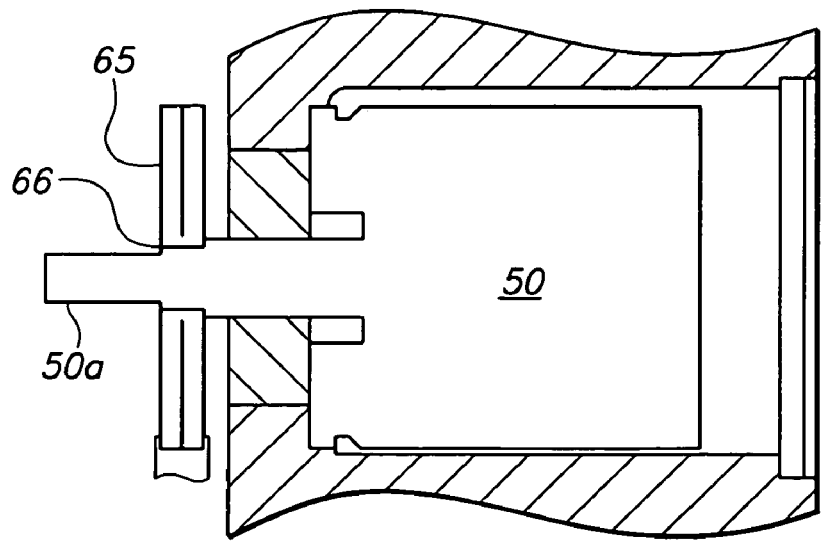
FIG. 5 is a side perspective view of a portion of the sensor of FIG. 1 showing the secondary gear welded to the RVDT.

A series of anti-backlash gears 65 or secondary gears are rigidly coupled to each of the RVDT shafts 50a on top of the main housing cover plate 31, for example, by a controlled penetration laser weld 66, as shown in FIG. 5. Each of these secondary gears 65 measures 0.844 inches in diameter with 79 teeth provided at a diametral pitch of 96, and are positioned to mesh with the primary gear 60. Advantageously, when one of the RVDT's 50 jams, the weld 66 will break off and the secondary gear 65 will rotate freely. The design will prevent the anti-backlash gear from coming loose and jamming the entire mechanism. If the RVDT shaft 50a breaks, the secondary gear 65 is supported by a bushing 67 built into the top portion of cover which will prevent the gear from being loose in the gearbox.

Figure 6:
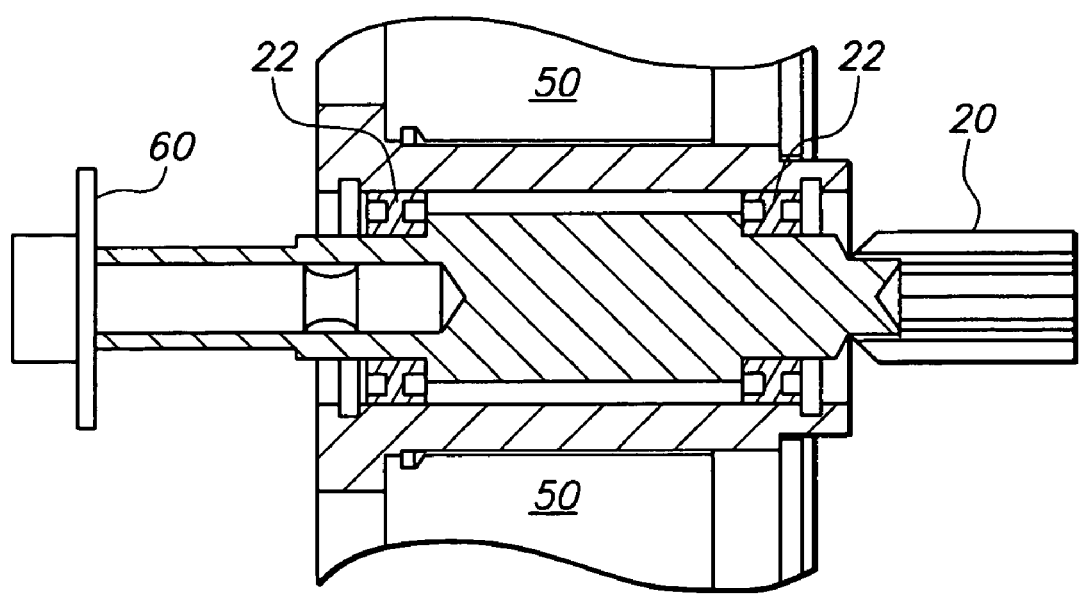
FIG. 6 is a side perspective view showing the main shaft mounted in the main housing.
Figure 7:
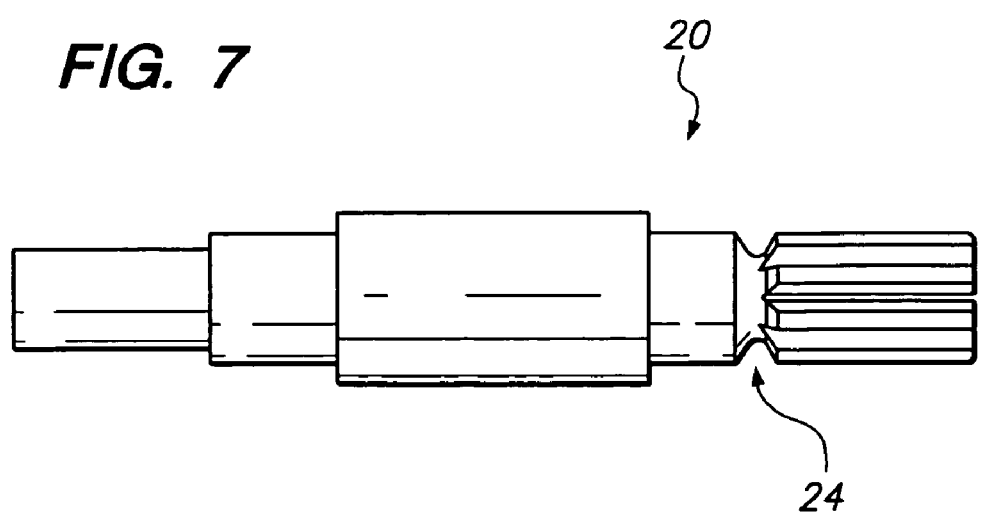
FIG. 7 is a side perspective view of the main shaft.
Figure 8:
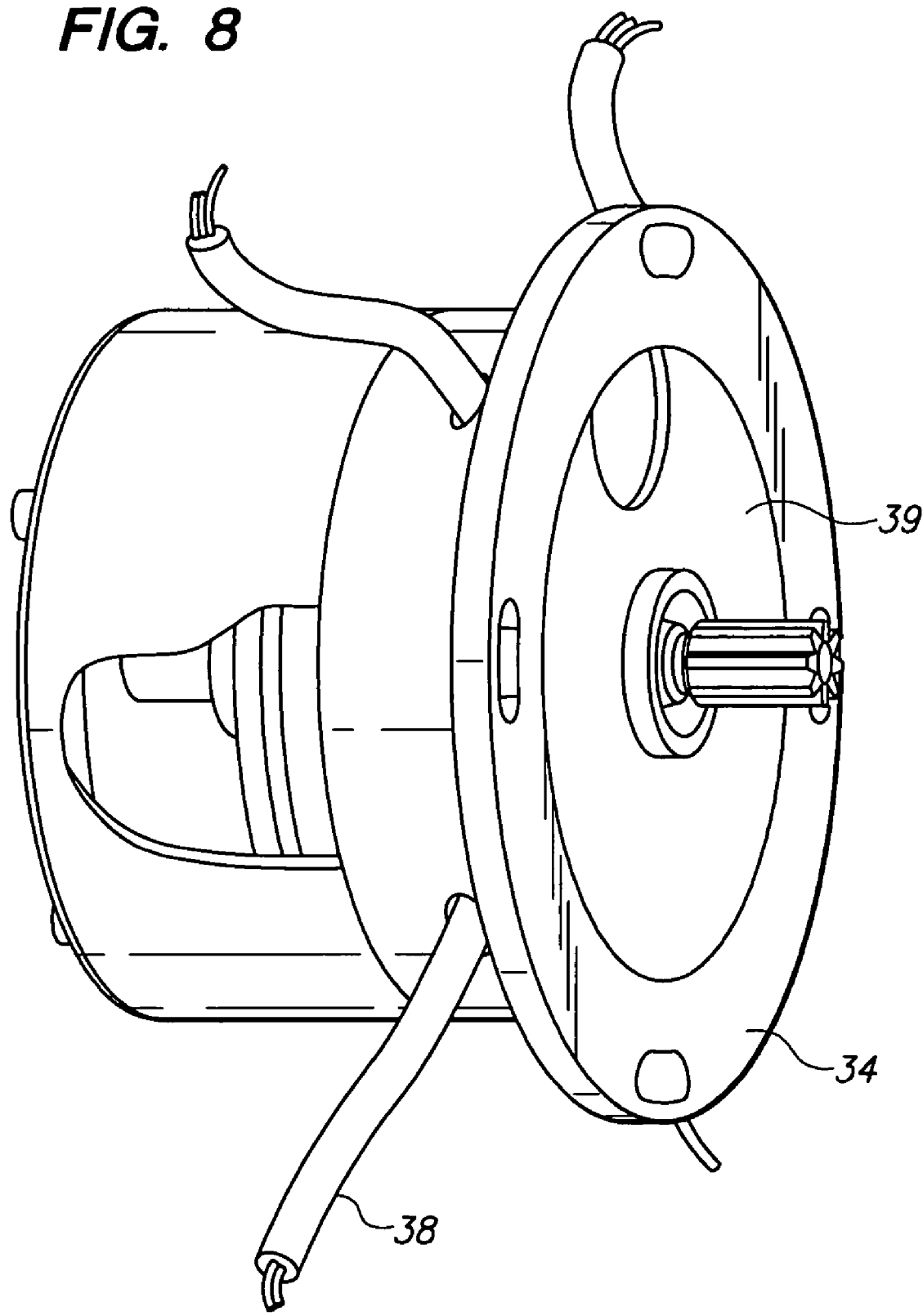
FIG. 8 is a perspective view of the sensor of FIG. 1 with front and rear protective covers in place.

Referring now to FIGS. 6 and 7, the main shaft 20 is supported in shaft housing 35 by a pair of precision bearings 22. Further, the main shaft 20 is formed to have a shear notch 24, which is designed to break off in the event of a jam within the RVDT's or in the gear box. As shown in FIG. 8, a front cover 39 is fit over the main shaft 20 and inside the flange 34, and the front cover is formed from aircraft grade stainless steel.

It will be appreciated that numerous variations can be made to the foregoing preferred embodiment without departing from the spirit of the invention, which is defined by the accompanying claims.

What is claimed is:

1. An angular displacement sensor, comprising a primary gear coupled to an input shaft, a plurality of secondary gears arranged around and coupled to the primary gear, and a plurality of displacement sensors integrally coupled with the secondary gears, wherein each secondary gear is coupled to a shaft of one of the angular displacement sensors in a manner that permits breakaway in case of a jam, such that the remaining angular displacement sensors continue sensing if one of the secondary gears breaks away from the corresponding shaft.

2. A sensor as in claim 1, further comprising a shear notch formed on the input shaft.

3. The angular displacement sensor of claim 1 wherein the secondary gears are coupled to the shafts of the angular displacement sensors by a controlled penetration laser weld, and wherein the laser weld breaks if the secondary gear becomes jammed.

4. The angular displacement sensor of claim 1 comprising at least four secondary gears arranged around and coupled to the primary gear, and at least four displacement sensors integrally coupled with the secondary gears.

5. A displacement sensor, comprising:
an input shaft adapted to have one end thereof coupled to a load of interest;
a main gear affixed to another end of the input shaft;
a plurality of secondary gears arranged to mesh with the main gear and each affixed to a of displacement sensor; and
a cover having a top portion and cylindrical portion that at least partially surrounds the main gear and secondary gears, wherein the top portion includes a plurality of cylinders integral therewith for respectively receiving and containing the plurality of secondary gears, such that if a secondary gear comes loose it will be contained.

6. A sensor as in claim 5, further comprising a shear notch formed on the input shaft.

7. A sensor as in claim 5, wherein each secondary gear is coupled to a sensor in a manner that permits breakaway in the event of a jam.

8. A sensor as in claim 5, further comprising:
a main cylindrical housing, wherein the shaft housing is formed coaxially inside the main housing;
a cover plate enclosing one end of the main housing and having a central opening and a plurality of secondary openings distributed around the central opening, wherein the shaft housing is affixed proximate to the central opening and the input shaft extends through the central opening, wherein the main gear is affixed to the input shaft outside of the main housing, wherein the angular displacement sensors are affixed in corresponding secondary openings with the sensor shafts extending through the openings, wherein the secondary gears are affixed to corresponding sensor shafts outside the main housing.

9. A sensor as in claim 8, wherein each secondary gear is fixed to its corresponding sensor shaft by a controlled penetration laser weld.

10. A sensor as in claim 5, further comprising a self-null mechanism coupled to the main gear, wherein the self null mechanism comprises a null plate, a torsion spring and a retainer plate.

11. A method of sensing angular displacement, the method comprising the steps of:
(a) providing an angular displacement sensor that includes an input shaft having one end thereof coupled to a load of interest;
a shaft housing including bearings supporting the input shaft;
a main gear affixed to another end of the input shaft;
a plurality of secondary gears mounted so as to mesh with the main gear; and
a plurality of angular displacement sensors each having a shaft wherein each of the secondary gears is affixed to the corresponding shaft;
(b) sensing angular displacement using all of the angular displacement sensors;
(c) jamming one of the secondary gears;
(d) breaking the jammed secondary gear away from the corresponding shaft such that the secondary gear is no longer coupled with the shaft; and
(e) sensing angular displacement with the angular displacement sensors that are still coupled to their corresponding shafts.

* * * * *

UNITED STATES PATENT AND TRADEMARK OFFICE
CERTIFICATE OF CORRECTION

PATENT NO. : 7,353,608 B2  Page 1 of 1
APPLICATION NO. : 11/339040
DATED : April 8, 2008
INVENTOR(S) : Saeed Yazdani It is certified that error appears in the above-identified patent and that said Letters Patent is hereby corrected as shown below:

Title page
Item (73), Assignee:
Please replace "Custom Sensors & Technologies, Inc." with "Kavlico Corporation"

Signed and Sealed this
Eighteenth Day of August, 2015

Michelle K. Lee
*Director of the United States Patent and Trademark Office*